United States Patent
Feder et al.

(10) Patent No.: US 9,208,428 B2
(45) Date of Patent: Dec. 8, 2015

(54) IDENTIFICATION ARTICLES

(75) Inventors: Eli Feder, Haifa (IL); Gili Drori, Ramat Hasharon (IL)

(73) Assignee: T.A.T.-TADBIK ADVANCED TECHNOLOGIES LTD, Petach Tikva (IL)

( * ) Notice: Subject to any disclaimer, the term of this patent is extended or adjusted under 35 U.S.C. 154(b) by 312 days.

(21) Appl. No.: 13/591,848

(22) Filed: Aug. 22, 2012

(65) Prior Publication Data

US 2013/0049349 A1 Feb. 28, 2013

Related U.S. Application Data

(60) Provisional application No. 61/525,949, filed on Aug. 22, 2011.

(51) Int. Cl.
*G06K 19/077* (2006.01)
*G09F 3/00* (2006.01)

(52) U.S. Cl.
CPC ............ *G06K 19/0776* (2013.01); *G09F 3/005* (2013.01)

(58) Field of Classification Search
CPC .................... G09F 3/005; G09F 2003/0254
USPC .......................................... 283/81; 40/6, 633
See application file for complete search history.

(56) References Cited

U.S. PATENT DOCUMENTS

| | | |
|---|---|---|
| 4,314,415 A | 2/1982 | De Woskin |
| 5,318,817 A | 6/1994 | Ohno et al. |
| 5,395,667 A | 3/1995 | Ohno et al. |
| 5,799,426 A | 9/1998 | Peterson |
| 5,973,598 A | 10/1999 | Beigel |
| 6,836,215 B1 | 12/2004 | Laurash et al. |
| 7,071,826 B2 | 7/2006 | Peterson |
| 7,535,356 B2 | 5/2009 | Lerch et al. |
| 2004/0056769 A1* | 3/2004 | Peterson .......................... 40/633 |
| 2004/0128892 A1* | 7/2004 | Valenti, Jr. ...................... 40/633 |
| 2007/0120687 A1 | 5/2007 | Lerch et al. |
| 2008/0236011 A1* | 10/2008 | Bekker ............................ 40/633 |
| 2009/0051530 A1 | 2/2009 | Brooks et al. |
| 2009/0286033 A1* | 11/2009 | Taghavi et al. ............... 428/41.8 |
| 2010/0154264 A1 | 6/2010 | Scott et al. |

FOREIGN PATENT DOCUMENTS

| | | |
|---|---|---|
| DE | 102008013704 | 9/2009 |
| EP | 552656 | 7/1993 |
| EP | 0739173 | 10/1996 |
| EP | 1012804 | 6/2000 |

* cited by examiner

*Primary Examiner* — Kyle Grabowski
(74) *Attorney, Agent, or Firm* — Dorsey & Whitney LLP

(57) ABSTRACT

Presently disclosed subject matter is directed to an identification article, methods of its manufacture and a sheet material forming part thereof. The article in accordance with the disclosed subject matter has a first end and a second end configured for attachment to each other through a contact section configured at either the first end or the second end. The article comprising a first, top layer including a bottom side, a second, bottom layer including a top side, and an identification component, wherein the bottom side of the first layer and the top side of the second layer bonded to at least encapsulate therebetween the identification component. In addition, the contact section comprises a release section constituting an end portion of the second layer, coated with a release agent on the top side thereof.

10 Claims, 5 Drawing Sheets

IDENTIFICATION ARTICLES

CROSS-REFERENCE TO RELATED APPLICATIONS

This application claims priority to U.S. Provisional Application No. 61/525,949 filed on 22 Aug. 2011, the disclosure of which is incorporated herein, in its entirety, by this reference.

TECHNICAL FIELD

This presently disclosed subject matter relates to identification articles and methods of their manufacturing.

BACKGROUND

References considered to be relevant as background to the presently disclosed subject matter are listed below:
U.S. Patent Application Publication No. 2009051530
U.S. Pat. No. 6,836,215
U.S. Pat. No. 7,071,826
U.S. Pat. No. 5,973,598

Acknowledgement of the above references herein is not to be inferred as meaning that these are in any way relevant to the patentability of the presently disclosed subject matter.

U.S. Patent Application Publication No. 2009051530 is directed to a tagging material for the production of electronic identification tags.

U.S. Pat. No. 6,836,215 is directed to an information band for mounting an electrically conductive circuit, such as a radio-frequency identification (RFID) tag. The band comprises a base strip and a top strip. A single sheet of label stock can include a plurality of such bands such that the sheet can be passed through a conventional printer to accept printed indicia onto a surface of one or more bands.

DE102008013704 is directed to a label arrangement comprising a carrier layer, an anti-adhesion layer, a first adhesive layer, a material reinforcing layer, a second adhesive layer, and a printable covering layer.

U.S. Pat. No. 5,973,598 is directed to an enhanced identification tag that produces an identification (ID) signal, i.e., a radio frequency (RF) signal carrying identification information, capable of being interpreted by an electronic reader device. An identification tag in accordance with this publication is characterized by a flexible substrate, programmable encoder circuitry formed on said substrate defining identification information, an antenna, and signal generator circuitry carried by said substrate responsive to said encoder circuitry for applying a radio frequency signal bearing said identification information to said antenna.

U.S. Patent Application Publication No. 2004056769 is directed to a band for carrying information including a first band section having a bottom side, a first bonding layer disposed over a significant portion of the bottom side and a circuit, configured to carry information, bonded to the bottom of the first band section. The band also includes a second band section having a top side and a bottom side, where the top side is bonded to the bottom side of the first band section such that a continuous portion of the first and second band sections are bonded around the entire circuit. The band further includes a second adhesive layer disposed over a significant portion of the bottom side of the second band section and a release section having a top side, the top side bonded to the bottom side of the second band section.

General Description

The presently disclosed subject matter is directed towards identification articles and methods of their manufacture. In particular, an article in accordance with the presently disclosed subject matter is in a form of a band fitted with an identification component inlay, such as an information storing tag, e.g. RFID (radio frequency identification) tag inlay.

The band in accordance with the disclosed subject matter comprises an identification component sandwiched between two layers of strip material substantially bonded to each other and enveloping the identification component, and further provided with a release section at one end thereof, the release section constituting a portion of one of the two layers of strip material.

In accordance with an embodiment of the disclosed subject matter, a bottom side of a first layer is coated with an adhesive layer adapted to adhere to a top side of said second layer. At least one end portion of the second layer is a release section provided with a coating of a release agent which provides a release effect against the adhesive.

Optionally, the second strip material is provided with a cut or perforation, separating the coated with the release agent end portion from the rest of the strip thus constituting the release section.

An identification article in accordance with one aspect of the disclosed subject matter has a first end and a second end configured for attachment to each other through a contact section configured at either the first end or the second end. The article comprises:
  a first, top layer comprising a bottom side;
  a second, bottom layer comprising a top side;
  an identification component;
  wherein the bottom side of the first layer and the top side of the second layer bonded to at least encapsulate therebetween the identification component; and wherein the contact section comprises a release section constituting an end portion of the second layer, coated with a release agent on the top side thereof.

In accordance with an embodiment, the article comprises an adhesive layer disposed over at least a portion of the bottom side of the first layer. In accordance with another embodiment the article is configured as a bracelet and/or a necklace or any item which may be carried on a user. In accordance with another embodiment the article is configured to indicate tampering.

In accordance with another embodiment the identification component is configured to carry information. In accordance with an embodiment the identification component is provided with an adhesive layer thereon.

In accordance with another aspect of the invention, a method for manufacturing an identification article comprises:
  providing an adhesive over a significant portion of a bottom side of a first, top layer;
  disposing a coat of a release agent over a release section at a top side of a second, bottom layer;
  at least partially separating the release section from an uncoated section of the top side of the second, bottom layer;
  providing an identification component between the first layer and the second layer; and
  bonding the top side of the second layer to the bottom side of the first layer, wherein the bond between the first and second band sections encapsulates the identification component.

In accordance with another embodiment, the method further comprises cutting the bottom layer to provide a releasable portion constituted by the release section, the releasable portion configured to expose the adhesive layer when released.

In accordance with yet an aspect of the invention, a method for manufacturing an identification article comprises:
- providing a first prefabricated strip of material comprising a first layer of material, an adhesive layer, and a release liner;
- providing a second prefabricated strip of material having a top side and a bottom side, the strip having a first edge and a second edge spaced apart and defining an area therebetween, comprising a release section constituted by a release agent disposed over a portion of the area at the top side thereof, the release section being spaced apart from the first edge and the second edge of the strip, and comprising a slit extending along a boundary of the release section, the slit having a first end and a second end such that the first end is closer to the first edge than the second end, and the second end is closer to the second edge than the first end;
- removing the release liner from the first strip of material exposing the adhesive;
- providing an identification component over either the first layer or the second layer;
- bonding the first layer of strip material to the top side of the second layer of strip material to encapsulate the identification component therebetween;
- cutting the bonded layers of strip material to a desired shape, such that the slit performed along the release section now essentially separates a release section from the uncoated with the release agent section of the band.

In accordance with an embodiment, any one of the methods in accordance with the disclosed subject matter further comprise configuring any one of the first layer and the second layer to indicate tampering.

In accordance with an embodiment of the disclosed subject matter at least one of the first layer and second layer are pre-fabricated.

In accordance with an embodiment of the disclosed subject matter the identification component is provided with an adhesive layer thereon.

In accordance with yet an aspect of the disclosed subject matter, a strip of material has a first edge and a second edge spaced apart and defining an area therebetween. The strip of material comprises a release section constituted by a release agent disposed over a portion of the area, the release section being spaced apart from the first edge and the second edge, and comprising a slit extending along a boundary of the release section, the slit having a first end and a second end such that the first end is closer to the first edge than the second end, and the second end is closer to the second edge than the first end.

In accordance with an embodiment the slit is C-shaped. In accordance with another embodiment several like strips are attached to each other. In accordance with this embodiment several like strips are separated by perforations.

In use of an article in accordance with the disclosed subject matter, the coated portion is released to reveal the adhesive layer at the end portion of the strip which is brought to encounter the opposite end of the article at the top side of the first layer, adhering thereto and thus forming a band.

The strip material of one or both the first layer and the second layer in accordance with the disclosed subject matter can be made of any suitable material expressing properties that meet the required flexural rigidity and durability. Examples of such materials can be polymers, polyesters, polypropylene, cloth, paper, woven/non-woven material, rubber, etc., or any combination thereof, such as a laminate, etc.

Moreover, the layers of the article can be identical or may differ in composition, properties, dimensions (such as thickness, flexibility) as desired. The strip of material can be a single layer of material or a laminate of more than one layer. Regardless of the number of layers, one or both of the strips of material can be substantially water impermeable.

Flexural rigidity denotes a material property that is a function of a combination of strip thickness, width, and material modulus of elasticity.

One or both faces of the band can be configured for carrying images, e.g. advertizing, identification information, etc., such as printed or through coating of thermal imaging surface.

The identification component can be a component configured for information storage and/or retrieval, such as an RFID tag inlay. The RFID tags are electrically conductive circuits that include encoding circuitry (such as a memory device that can be programmed to hold unique information) and signal-generating circuitry (including an antenna) to facilitate the transfer of information between the encoding circuitry and a remote reader. The tags are substantially thin, and can either be fabricated from discrete components or placed directly onto a strip layer through deposition of conductive inks or foils. The RFID tags can further be active, semi passive or passive devices. The prefabricated identification component can be a wet inlay, i.e. configured with a pressure sensitive adhesive layer or a dry inlay substantially devoid of any adhesive layer.

Release agents can be silicone, crosslinkable silicone or other coatings, and materials that have a low surface energy which provide a release effect against an adhesive material, whereby any layer of material adhered thereto is easily and readily detached therefrom without effecting the layer carrying the adhesive.

BRIEF DESCRIPTION OF THE DRAWINGS

In order to understand the presently disclosed subject matter and to see how it can be carried out in practice, embodiments will now be described, by way of non-limiting examples only, with reference to the accompanying drawings, in which.

DETAILED DESCRIPTION OF EXAMPLES OF THE PRESENTLY DISCLOSED SUBJECT MATTER

Examples of the article and the methods of its manufacturing will be described hereinafter.

Figure 1:
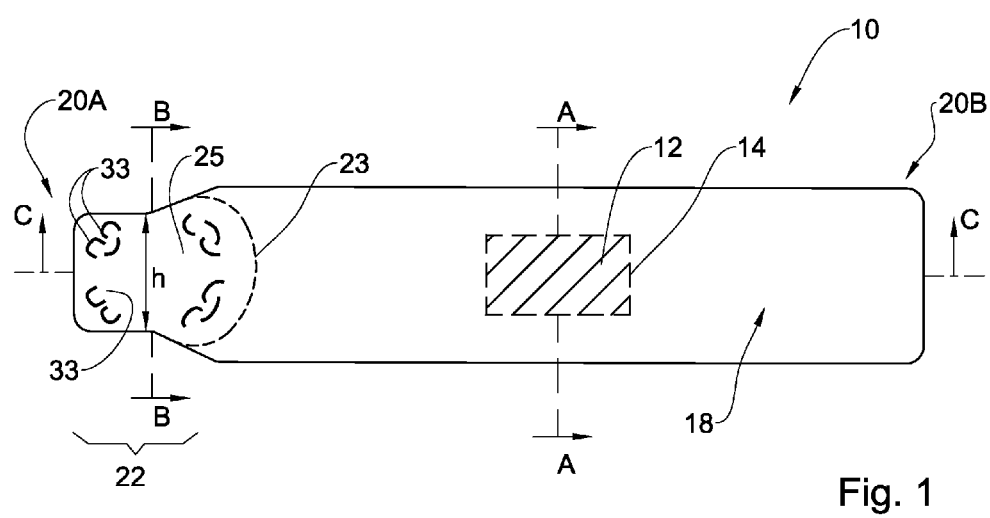
FIG. 1 is a schematic top view of an article in accordance with an example of the presently disclosed subject matter.

Referring now to the drawings, and more particularly to FIGS. 1 to 4, there is shown an article in accordance with the presently disclosed subject matter, generally designated as 10. FIG. 1 illustrates a top view of the article 10 representing a band fitted with an identification component 12 the position of which is represented by the dashed lines 14. The band 10 comprises a first, top layer 16, a second, bottom layer 18 (seen e.g. in FIGS. 2-4), a first end 20A and a second end 20B, the band having a substantially flat configuration encapsulating the identification component 12. The first end 20A and the second end 20B of the band 10 are configured for attachment to each other through a contact section 22 provided at the first end 20A as will be described through an example hereinbelow.

Figure 2:
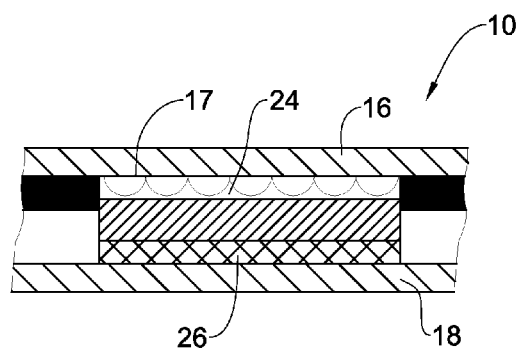
FIG. 2 is schematic cross-section taken along line A-A in FIG. 1.
Figure 3:
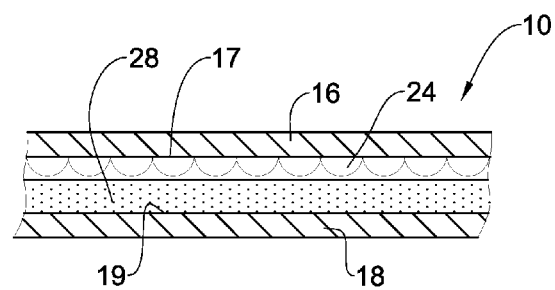
FIG. 3 is a schematic cross-section taken along B-B in FIG. 1.
Figure 4:
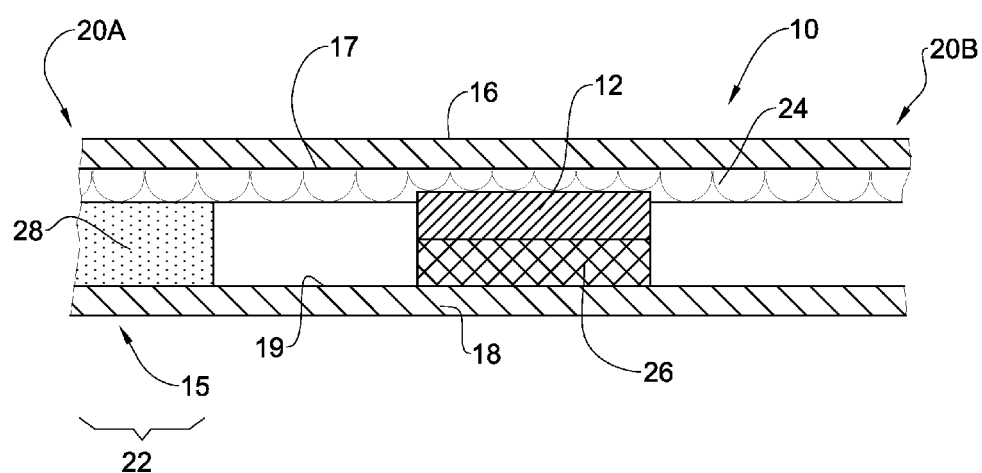
FIG. 4 is a schematic cross-section taken along C-C in FIG. 1.

In accordance with an example of the disclosed subject matter the components of the band are bonded to each other. As seen in FIGS. 2-4, a bottom side 17 of top layer 16 is provided with an adhesive layer 24 disposed over a substantial surface thereof.

The adhesive layer 24 is configured to substantially bond the bottom side 17 of the top layer 16 and a top side 19 of the bottom layer 18 so as to encapsulate the identification component 12 therebetween at any predetermined position.

Although in the illustrated example the adhesive layer is depicted as a homogeneous, uniform and continuous layer, it will be appreciated that the adhesive layer can be in a form of separate stripes or spots or other patterns of adhesive material provided on the top layer.

As best seen in FIGS. 3 and 4, the top side 19 of the bottom layer 18 is provided with a coating of a release agent 28 substantially over the contact section 22 at the first end 20A of the band 10. The bottom layer 18 is cut in the vicinity of the contact section 22 separating the layer 18 into a section coated with the release agent 28 and the rest of the layer 18 substantially devoid of coating on the top side 19 thereof (the separation is illustrated by a dashed line 23 in FIG. 1). Such a cut provides for a releasable section 25 of the bottom layer which in use is released and removed to expose the adhesive layer 24 provided over the bottom side 17 of the top layer 16. The contact section 22 is then brought over the second end 20B of the band and adhered thereto. The adhesive layer 24 can be a pressure sensitive layer which will adhere upon exertion of pressure thereupon. The release agent according to this example is silicone.

In accordance with the illustrated example, identification component 12 is partially received in the adhesive layer 24 and is further provided with an adhesive layer 26 on an opposite side thereof. Alternatively, the identification component can be in a form of a "dry" inlay, i.e. devoid adhesive layer 26.

Alternatively, the top layer 16 and the bottom layer 18 can be at least partially bonded to each other e.g. by thermal bonding around the identification component, encapsulating the same therebetween.

In order to provide evidence in case of tampering of the band during use (e.g. following the adhesion of the contact surface 22 to the second band end 20B), the contact section may be provided with temper evident indication such as die cuts 33 over the contact section 22 of the band. The temper evident identification can be provided on either the top layer of the band or on both layers of the band during the manufacturing process (e.g. cut through the band). The identification is such that following adhering of the contact section of the band end 20B, in the event that an attempt is made to tamper with the adhered, contacted section, the band will tear or be damaged providing the identification of tampering.

The shape and size of the strip is dictated by the desired function of the band and may vary in width and length as desired. The band according to an example can be sized and shaped so as to fix it around a wrist, ankle, neck, etc. of a user (human/animal) or any object that needs to be tracked or to carry information.

Figure 5:
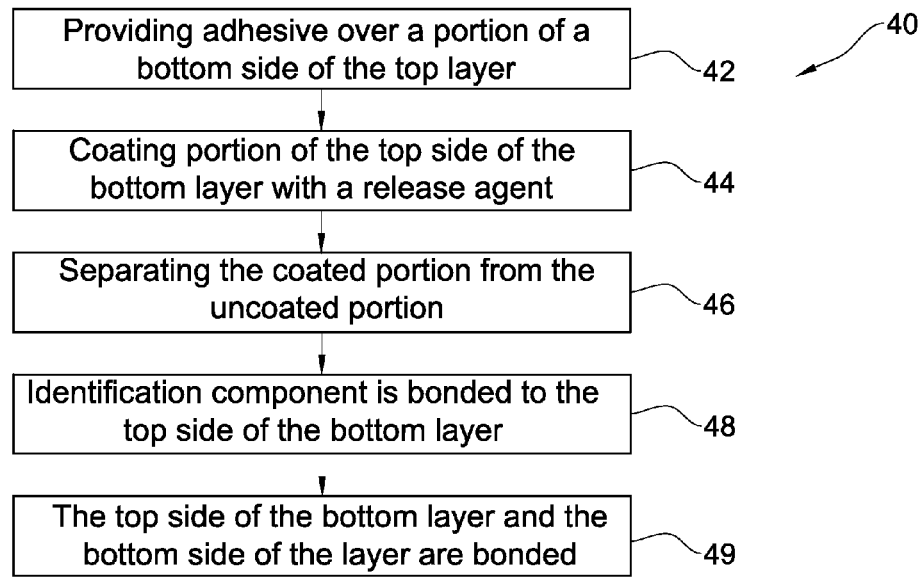
FIG. 5 is a flow diagram depicting a method of manufacturing the article of FIG. 1 in accordance with one example of the disclosed subject matter.

Turning now to FIG. 5 providing a flow diagram, method steps 40 of manufacturing the band 10 in accordance with an example will now be described. The band comprising a first layer of strip material, a second layer of strip material, an adhesive layer, an identification component and configured with a release section at a portion thereof. At step 42, adhesive 24 is applied at least over a portion of the bottom side 17 of the top layer 16. Next, at 44 a release agent 28 is coated substantially over the contact section 22 over the top side 19 of the bottom layer 18. At 46, the coated portion of the contact section 22 is substantially separated from the uncoated portion of the bottom layer 18 to provide for a releasable section, configured for exposing the adhesive 24 when the release section is removed. Next at 48 the inlay of identification component 12 is bonded to the top side 19 of the bottom layer 18. Finally, at 49, the bottom side of the top layer 16 and the top side 19 of the bottom layer 18 are bonded together encapsulating the inlay.

It will be appreciated that any of the steps are interchangeable. For example, step 48 can be performed prior to step 46, and other variations in method of manufacturing are envisioned, without departing from the general concept of the presently disclosed subject matter.

Figure 6:
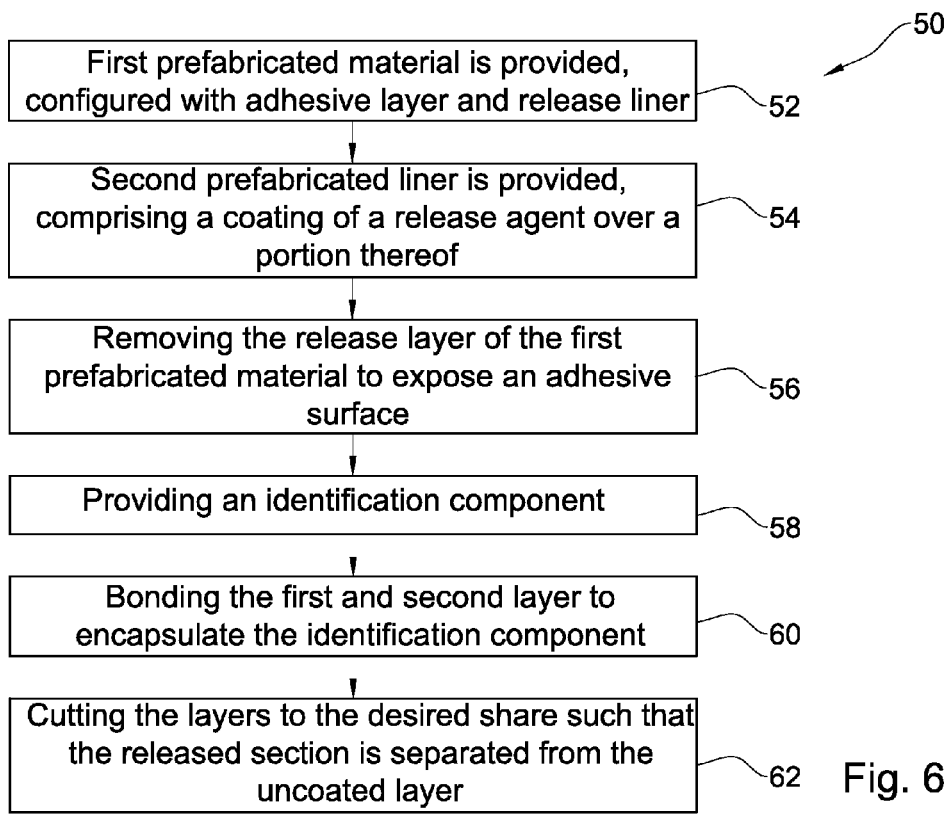
FIG. 6 is a flow diagram depicting a method of manufacturing the article in accordance with another example of the disclosed subject matter.

FIG. 6 provides a flow chart of an alternative method 50 of manufacturing the band 10 in accordance with yet an example. In accordance with this example, at 52, a first prefabricated strip of material 115 is provided comprising a first layer of material 16, an adhesive layer 24, and a release liner removed prior to adhesion with the second layer. At 54, a second prefabricated strip of material 118 is provided configured with a coating of a release agent 28 over a portion thereof and partially cut at one edge of the portion. At 56 the release liner is removed from the first 116 strip exposing the adhesive 24. At 58 an identification component is provided and bonded to one of the layers of the first 116 or second 118 strip material. At 60, the layers of strip material are bonded to encapsulate the identification component. Finally, at step 62 the bonded layers of strip material are cut to the shape of the band, such that the cut performed at 52 around the release section now essentially separates the release section from the uncoated with the release agent section of the band. In use the release section will be removed, exposing the adhesive layer.

Figure 7:
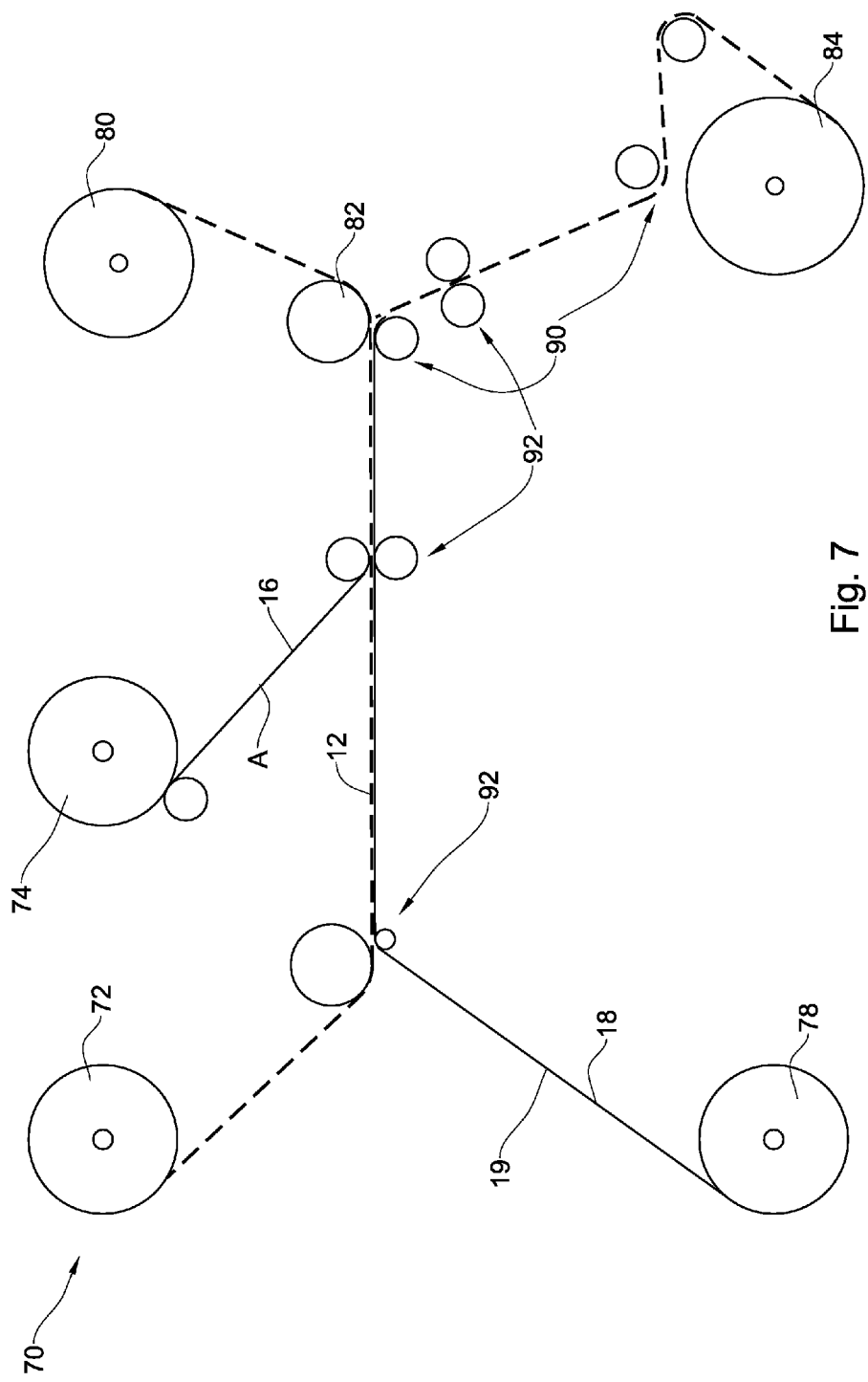
FIG. 7 is a schematic illustration of a manufacturing plan for manufacturing the article in accordance with one example of the disclosed subject matter.

FIG. 7 schematically represents a machine utilized for the manufacturing of the article in accordance with one example of the disclosed subject matter. A first layer 16' having a bottom surface 17 coated with an adhesive material is released from an unwinding roller 74. Simultaneously, a second layer 18' is released from an unwinding roller 78. A portion of the second layer is provided with a coating of release agent and is pre cut around a portion thereof (description of the second layer is provided with reference to FIG. 8). A wet inlay 12 is released from the roller 72. The inlay has a top, dry side and a bottom side provided with an adhesive layer. The inlay is placed with its bottom side over the top surface 19 of the second layer 18'. The inlay is sandwiched between the first and second layers as it passes the pulleys 92. As the sandwiched layers proceed they are tensioned and sucked undergoing the edge of the cutting blades 82 passing along the side edges of the layers and further partially cut along the length of the passing band. The layers are cut around the side edges thereof to define the width of the final article and are perforated at predefined positions to define the length thereof. The cut off material is winded over the roller 80 and the final articles are winded over the roller 84.

The operation is continuous with the rollers, the pressure pulleys, and the cutting means controlled by a control device (not shown), e.g. a corresponding microprocessor means.

The layers of material are wider than the width of the final article. However the width of the layer configured with the adhesive is narrower that the width of the other layer such as to prevent unnecessary exposure of the machine parts to the adhesive during its passage under the rollers and pulleys 92 as well as during the disposal of the cut off trimmings of the layers passing under the cutting blades 82.

Figure 8:
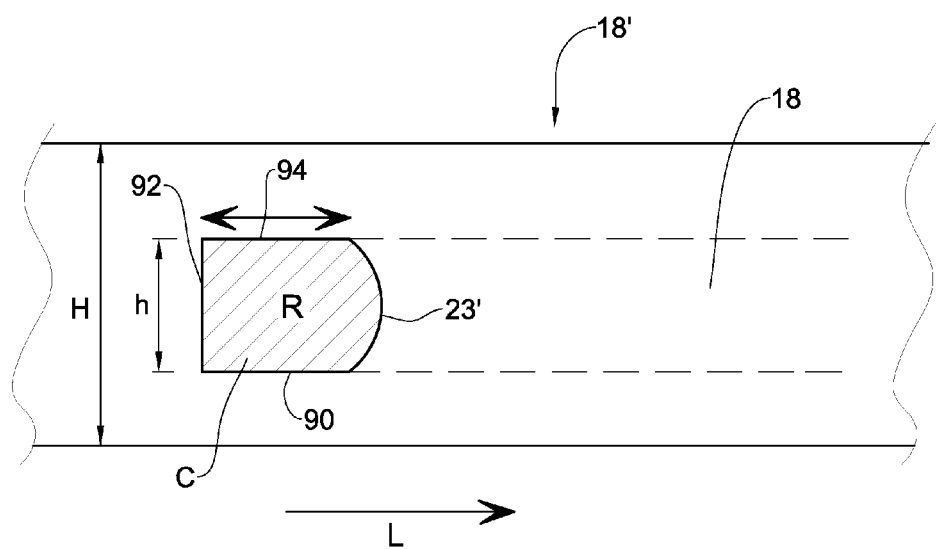
FIG. 8 is a schematic top view of a sheet material in accordance with an example of the presently disclosed subject matter.

FIG. 8 illustrates the layer of the second material 18' used during the manufacturing process exemplified in FIG. 7. The layer is provided with a coating of release agent R over an area C of the layer in a predetermined position. The shape and size of the coating C of the release agent R are determined in accordance with the desired dimensions of the release section on the envisioned article, i.e. corresponding with the width h of the release section 22. It will be noted that the width h of the coated area is smaller than that of the width H of the sheet material 18'. In fact the width h substantially corresponds to the width of the release section in the final article (noted in FIG. 1).

Prior to or following the coating, C-shaped slit 23' is performed over the sheet material 18' over an edge of the section transversing the longitudinal L direction of the sheet material 18'. The slit 23' is configured to allow detaching of the coated section from the first layer in the final article.

During the manufacturing process, the sheet material 18' is bonded to the first layer 16 and will then be trimmed together to assume the shape and size of the final article. The cut will be such so as to cut substantially around or near by the remaining edges 90, 92, 94, of the coated section. Resulting in that coated section C will be eventually cut or released from the remaining sheet 18' around all its edges being adhered to the first layer 16. In use, the coated section C will be releasable/detachable from the first layer.

At least one of the layers, e.g. second layer may be provided with a register mark in a form of a print mark, a hole, etching notch and the like so as to facilitate control of the entire process, positioning of the release coating, the inlay and/or introduction of the information into the inlay in the final article.

Whilst some examples have been described and illustrated with reference to some drawings, it will be appreciated that many changes may be made therein without departing from the general spirit and scope of the invention, mutatis, mutandis.

The invention claimed is:

1. An identification article having a first end including sides and a second end configured for attachment to each other through a contact section configured at the first end, the identification article comprising:
 a single bottom layer comprising a top side, and having a first portion and a second portion separated by a generally C-shaped slit, the generally C-shaped slit traversing substantially across an entire width of the identification article and terminating at the sides, the first portion extending from the generally C-shaped slit toward the first end of the identification article, the second portion extending from the generally C-shaped slit toward the second end of the identification article, the first portion being detachable from the second portion;
 a single top layer comprising a bottom side and an end portion generally opposing the first portion of the single bottom layer in a manner that the first portion of the single bottom layer covers at least part of the end portion of the single top layer;
 an adhesive layer disposed on the bottom side of the single top layer thereof;
 an identification component including a first side bonded to the adhesive layer and a second side generally opposite the first side, the second side of the identification component being adhesively bonded to the top side of the single bottom layer;
 wherein the bottom side of the single top layer and the top side of the single bottom layer are bonded together to at least encapsulate therebetween the identification component; and
 wherein the contact section is at least partially defined by:
  the end portion of the single top layer;
  a portion of the adhesive layer disposed on the bottom side of the end portion of the single top layer;
  the first portion of the single bottom layer; and
  a release agent disposed on the top side of the first portion of the single bottom layer and in contact with the adhesive layer.

2. The identification article in accordance with claim 1, further comprising an adhesive layer disposed over at least a portion of the bottom side of the single top layer.

3. The identification article in accordance with claim 2, wherein the release section is configured to expose the adhesive layer when released.

4. The identification article in accordance with claim 1, wherein the release agent includes silicone.

5. The identification article in accordance with claim 1, configured as a bracelet.

6. The identification article in accordance with claim 1, configured to indicate tampering.

7. The identification article in accordance with claim 6, wherein the end portion includes generally arcuate cuts in the single top layer that are configured to indicate tampering.

8. The identification article in accordance with claim 1, wherein the identification component is configured to carry information.

9. The identification article in accordance with claim 1, wherein the identification component is an RFID tag.

10. The identification article in accordance with claim 1, wherein the identification component is provided with an adhesive layer thereon.

* * * * *